July 15, 1969    L. M. HARRIS, JR    3,456,259
ELECTRONIC NAVIGATION SYSTEM
Filed March 23, 1967    3 Sheets-Sheet 1

INVENTOR.
LESLIE M. HARRIS, JR.
BY Martin L. Kach ATTY.

July 15, 1969

L. M. HARRIS, JR 3,456,259

ELECTRONIC NAVIGATION SYSTEM

Filed March 23, 1967

INVENTOR.
LESLIE M. HARRIS, JR.

BY ATTY.

United States Patent Office 3,456,259
Patented July 15, 1969

3,456,259
ELECTRONIC NAVIGATION SYSTEM
Leslie M. Harris, Jr., Fairport, N.Y., assignor to General Dynamics Corporation, a corporation of Delaware
Filed Mar. 23, 1967, Ser. No. 625,534
Int. Cl. G01s 1/44
U.S. Cl. 343—106                                   22 Claims

ABSTRACT OF THE DISCLOSURE

A bearing computer for a Tacan system is described which calculates bearing with respect to a ground beacon which transmits a reference signal and a pair of harmonically related signals of lower and higher frequency, specifically 15 Hz. and 135 Hz. The bearing computer itself includes primary and secondary phase locked loops which respectively track the 135 Hz. and 15 Hz. beacon signals. The loops produce clock pulses at a frequency much higher than 135 Hz. The bearing is computed by means of a counter which counts the clock pulses continuously. The counter is synchronized by synthesized 135 Hz. or 15 Hz. signals from the phase locked loops. The counter is read out upon occurrence of the reference signal. The digital number read out from the counter is a measure of the bearing. This number is updated upon each occurrence of the reference signal and is displayed. The computer also derives information as to the absence or presence of the 15 Hz. and 135 Hz. beacon signals and uses such information to select a mode of operation of the system which may either be a primary mode, utilizing the 135 Hz. and 15 Hz. beacon signals and therefore provides a more accurate bearing measurement, or the 15 Hz. signal only, in the absence of the higher frequency signal. In the event that the 15 Hz. signal is determined to be absent by the mode selection circuits, neither the primary or secondary modes are actuated and the computer indicates the lack of meaningful bearing information as in the display.

---

The present invention relates to electronic navigation systems and more particularly to a system for computing the bearing of a craft, with respect to a beacon which transmits signals received by the craft.

The invention is especially suitable for use in a Tacan system for computing the bearing between a Tacan beacon that transmits a composite signal consisting of reference signals and harmonically related signals. The invention is also suitable for use in other position location systems which utilize signals, the phase or time relationship between which is a measure of bearing or azimuth of a craft or vehicle with respect to a beacon.

In Tacan systems, bearing is determined by measuring the phase angle between the north reference burst and the proper positive-going zero cross-over of the 135 Hz. signal (135 Hz. being the ninth harmonic of the 15 Hz. signal) which is transmitted by the beacon by way of an amplitude modulated envelope of random pulses which are transmitted by the beacon at approximately 2,700 pulses per second. The proper 135 Hz. cross-over is the one that is closest to the positive-going zero cross-over of the 15 Hz. signal. By virtue of the nature of the Tacan beacon signal, the computation of the bearing with the requisite accuracy and rapidity has presented a number of difficulties. The beacon signal is generated by a rotating ground beacon which can produce frequency variations in the 15 and 135 Hz. signals. Spurious signals close to the desired 15 and 135 Hz. signals are also generated due to the random nature of the 2,700 Hz. pulses on which the desired 15 and 135 Hz. signals are modulated. The signals themselves are generated in the microwave frequency range and are subject to deterioration due to noise, fading and the like. A bearing computation can be completely erroneous if the computation is made on the basis of noise, a false 15 Hz. or 135 Hz. signal produced by spurious sidebands or because the computer does not have sufficient dynamic response to follow the deviation in the frequency of the 15 Hz. or 135 Hz. signals from the beacon.

Accordingly, it is an object of the invention to provide an improved electronic navigation system.

It is a further object of the invention to provide an improved electronic navigation system for determining the bearing of a craft with respect to a beacon which transmits signals received by the craft.

It is a still further object of the invention to provide an improved bearing computer for a Tacan system.

It is a still further object of the invention to provide an improved computer system for measuring the bearing of a craft with respect to a beacon with greater accuracy than prior Tacan bearing computers.

It is a still further object of the present invention to provide an improved Tacan bearing computer which acquires and locks on to a beacon more rapidly than prior bearing computers.

It is a still further object of the present invention to provide an improved Tacan bearing computer which substantially eliminates false bearing measurements due to noise and other extraneous signals which may be received.

Briefly described, a bearing computer embodying the invention is adapted to be included in a system which receives, from a beacon, primary and secondary signals of different frequency, the phase relationship with respect to a received reference signal is a measure of the bearing of a craft containing the computer with respect to the beacon. The computer contains primary and secondary phase locked loops for respectively synthesizing signals corresponding it frequency and phase to the primary and secondary received signals and for producing trains of clock pulses which are synchronized with the primary and secondary signals and therefore follows variations in speed of rotation of the beacon. At least one of these trains of clock pulses is applied to a counter. Logic circuits responsive to the synthesized primary and secondary signal program the counter. Means are provided for reading out the counter upon occurrence of the referenced signal. The count, when read out, will be a measure of the phase relationship between the primary and secondary signals and the reference signal and therefore is a measure of the bearing of the bearing computer equipped craft with respect to the beacon. Display means may be provided for reading out the counter during each cycle or dwell (viz. upon occurrence of each reference pulse), so as to display the count in the form of a reading of bearing.

The computer may also include mode selection logic responsive to the received primary and secondary signals for enabling the bearing computation to be made on the basis of the primary signal, when both signals are present, or on the basis of the secondary signal, when the primary signal is absent. In the event that the secondary signal is not present, means are operative to control the display so as to indicate that the bearing signal is not a true indication of the bearing. The phase locked loops themselves include improved phase detection means and other circuits which permit the synthesized signals to accurately follow the received primary and secondary signals and acquire such signals rapidly.

The invention itself, both as to its organization and method of operation, as well as additional objects and advantages thereof will become more readily apparent FIG. 1 is a block diagram of a bearing computer embodying the invention;

Figure 1:
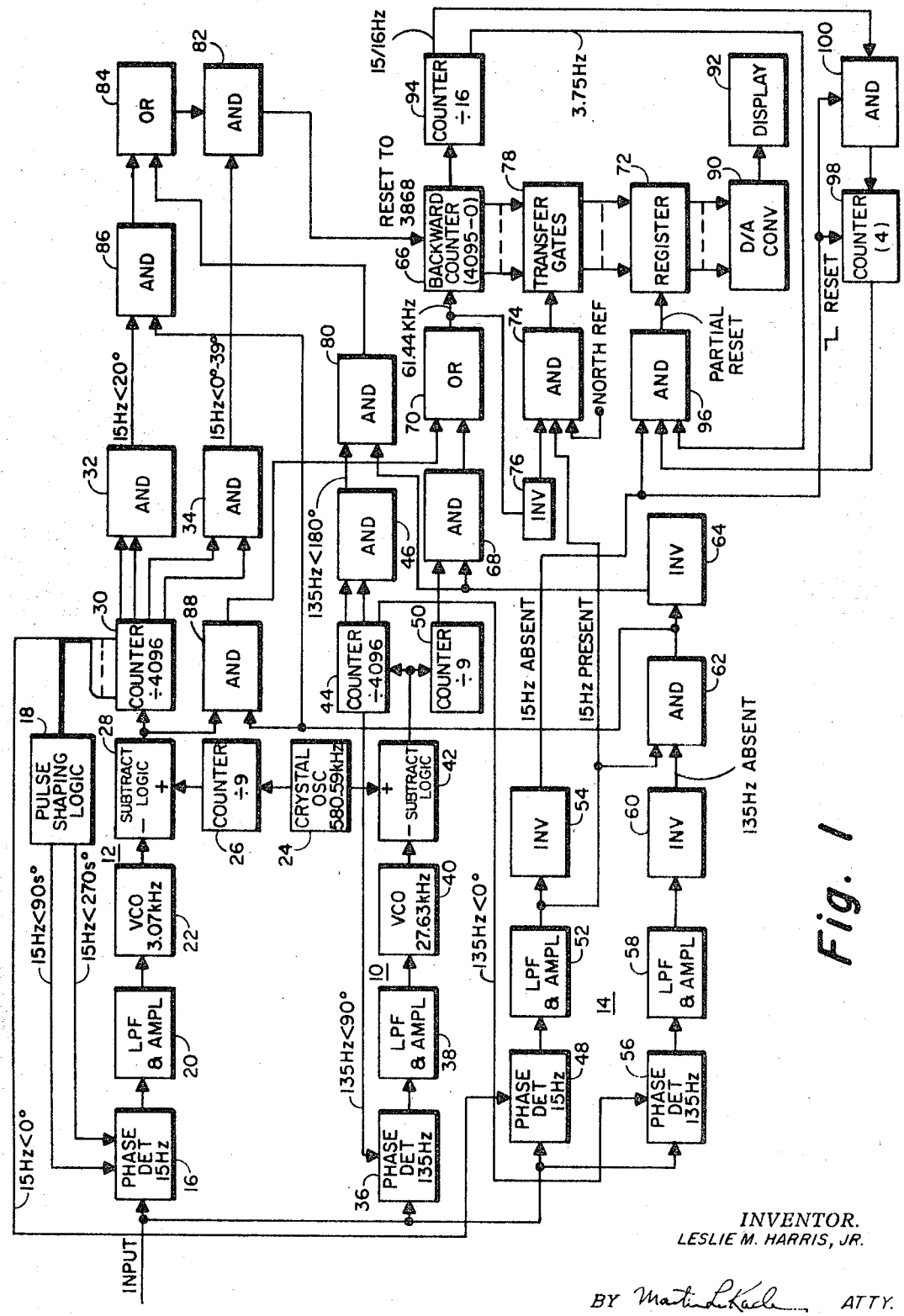

Referring more particularly to FIG. 1, the primary and secondary signals which are the 15 Hz. and 135 Hz. signals demodulated from the amplitude modulated envelope received from the beacon, as from a peak riding detector followed by a boxcar generator, are applied to the input of the system. These signals are utilized in a primary phase locked loop 10, a secondary phase locked loop 12 and a mode selection subsystem 14. The secondary phase locked loop 12 includes a phase detector 16 of a type which will be more fully described hereinafter in connection iwth FIG. 5. The phase detector 16 compares the received 15 Hz. signals with synthesized 15 Hz. signals produced by the loop 12. These synthesized signals are generated in a pulse shaping logic subsystem 18, which will be more fully described hereinafter in connection with FIGS. 5 and 6, which produces a pair of pulses which are shifted in phase respectively at 90° and 270° with respect to a synthesized output signal which is phase coherent with the received 15 Hz. signal. These phase detector input pulses are, however shortened in order to improve the accuracy of the phase detection process, as will be more fully discussed hereinafter, and are indicated by the symbol 15 Hz. $\angle 90s°$ and 15 Hz. $\angle 270s°$.

The error signal generated by the phase detector 16 is applied to a low pass filter and amplifier circuit 20. The circuit may be an operational amplifier having a feedback circuit designed to make the operational amplifier function as a low pass filter. Accordingly, a direct current error voltage is applied to a voltage controlled oscillator 22 which is indicated as producing an output frequency having a nominal value of 3.07 kHz. The frequency of this oscillator is desirably variable over a range of 10 to 1 (viz. from 1 kHz. to 10 kHz.). The oscillator itself may be a relaxation oscillator having a controllable discharge circuit. By discharge of the circuit at different voltage levels, the frequency of the oscillator may be varied over the wide range just mentioned.

The secondary phase locked loop 12 produces two signals; first a clock signal having a frequency indicated as being 61.44 kHz.; and second, a synthesized 15 Hz. signal which is phase coherent with the 15 Hz. component of the input signal. In order to generate both of these signals with a high degree of accuracy and yet accommodate the wide and rapid frequency swing resulting from the operation of VCO 22, a frequency translation subsystem is included. This subsystem utilizes a crystal oscillator 24 of high stability. The oscillator is indicated as producing an output frequency of 580.59 kHz. The crystal oscillator output is in the form of a pulse train and is applied to a counter 26 which divides the frequency by nine, thereby producing a frequency of 64.51 kHz. from which the VCO output frequency is subtracted in a subtract logic subsystem 28. It is advantageous to utilize a subtract logic system in the interest of greater accuracy. The system itself includes a plurality of flip-flop and gates designed in accordance with conventional logic design techniques which operate in a manner to subtract one and only one pulse from the train of higher frequency pulses from the counter 26 for each lower frequency pulse from the VCO 22. It is believed that this subtract logic is more accurate than additive logic arrangement, inasmuch as an additive logic arrangement could miss adding a pulse from the VCO in the event that the pulse coincided with a higher frequency pulse from the counter 26. Accordingly, the subtract logic 28 produces an output pulse train at the rate of 61.44 kHz. Inasmuch as the frequency inaccuracy in the VCO is now translated to the higher frequency, the overall percentage accuracy of the loop is improved by a factor of 20 times. This permits the use of a relatively inaccurate VCO 22, which is capable of the wide frequency range (viz. dyanmic range) necessary to follow the variations in the error signal voltage applied thereto without introducing incompatible inaccuracy in the phase locked loop.

Figure 2:
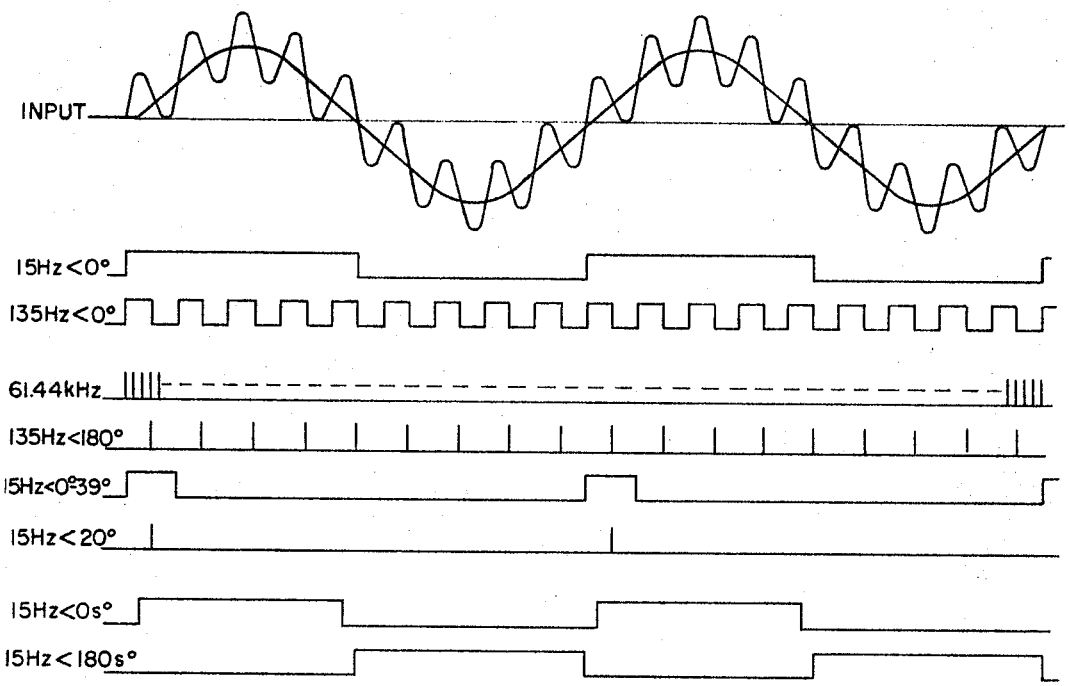
FIG. 2 is a waveform diagram showing the waveforms of signals appearing in the system of FIG. 1.

The subtract logic 28 output is applied to a counter 30 which divides by 4,096 to produce the 15 Hz. signal which is a synthesized version of the input signal and is phase coherent therewith. The phase coherent signal is indicated as being 15 Hz. $\angle 0°$. Other signals are provided in response to the outputs in the various flip-flop stages of the counter 30. These are pulses of 15 Hz. $\angle 20°$ which is obtained by an AND gate 32 and a pulse at a rate of 15 Hz. but of duration equal to 40° (0°–39°) of the 15 Hz. signal 15 Hz. $\angle 0°$–39°) which is obtained by an AND gate 34. The input signals shown in FIG. 2 in idealized form, as a sine wave of 15 Hz. on which 135 Hz. modulation is superimposed. The 15 Hz. $\angle 0°$, the 15 Hz. $\angle 0°$–39° and the 15 Hz. $\angle 20°$ are also shown in FIG. 2a.

The primary phase locked loop 10 is similar in many respects to the secondary phase locked loop described above. A phase detector 36 which operates with the input 135 Hz. component and with the synthesized 135 Hz. component is provided. The synthesized 135 Hz. component is, however, phase shifted by 90° in order that a phase detector 36 will provdie a null in its output error voltage when the synthesized 135 Hz. signal is phase coherent with the input 135 Hz. component. As mentioned above, phase detectors of the type used in the system will be described in connection with FIG. 3. The error voltage from the phase detector is applied to a low pass filter and amplifier circuit 38 similar to the low pass filter and amplifier circuit 20. This voltage is utilized to control a voltage controlled oscillator (VCO) 40 indicated as having a nominal frequency of 27.36 kHz. This voltage controlled oscillator 40 of the variable frequency multivibrator type and is shown in FIG. 4, which will be discussed in detail hereinafter. Again, this VCO 40 may have a dynamic range of approximately ±15% in frequency (viz. from 23.5 kHz. to approximately 31.8 kHz.).

A frequency translation system utilizing the crystal oscillator 24 is used in order to improve the accuracy of the loop 10. This system includes subtract logic 42 to which an output pulse train of 580.59 kHz. from the crystal oscillator 24 is applied together with the VCO 40 output pulse train. The subtract loop 42 is an absolute subtract system, as was explained in connection with the subtract loop 28. It therefore produces an output pulse train having a nominal frequency of 552.96 kHz. The pulse train is utilized in two ways. It is applied to a counter 44 which divides by 4,096 to produce the 135 Hz. component of the input signal. The signals produced are: (a) a pulse train which is phase coherent with the 135 Hz. component of the input pulse train, 135 Hz. $\angle 0°$, (b) the 135 Hz. $\angle 90°$ pulses previously mentioned which is applied to the phase detector 36, and (c) a pulse train the negative cross over of the 135 Hz. signal, 135 Hz. $\angle 180°$, which is obtained by means of an AND gate 46 connected to appropriate flip-flop stages of the counter 44. The 552.96 kHz. (nominal) output of the subtract logic is also applied to a divide by nine counter 50 which produces an output pulse train of 61.44 kHz. It will be noted that this pulse train is of the same frequency as the pulse train directly produced by the subtract logic 28 in the secondary loop. These pulse trains are used alternatively depending upon the mode of operation (viz. either primary or secondary) in the bearing computer. FIG. 2 shows the waveforms of the various pulses discussed above including the 61.44 kHz. pulse, the 135 Hz.∠180° pulses and the 135 Hz.∠0° pulses which are utilized in the mode selection subsystem, to be discussed hereinafter. It will be appreciated that the 135 Hz.∠90° signals applied to the phase detector 36 are similar to the 135 Hz.∠0° signal phase shifted 90° with respect thereto.

The mode selection subsystem 14 has two channels. One of these channels handles the 15 Hz. component of the input signal and the other 135 Hz. component thereof. The 15 Hz. channel includes a phase detector 48 which is responsive to the 15 Hz. component and to the synthesized 15 Hz.∠0° signal. This phase detector therefore operates to provide a maximum positive output in the event that the synthesized 15 Hz. signal is in phase with the 15 Hz. component of the input signal. In the event that this 15 Hz. signal is above a preset threshold, which will, of course depend upon the sensitivity and selectivity of the preselector video circuits and other receiver circuits of the Tacan set, a "signal present" output is obtained by means of a threshold circuit contained in an amplifier stage of the low pass filter and amplifier circuits 52. In other words, an amplifier in the low pass filter and amplifier circuits 52 performs the function of a signal present level detector. When the 15 Hz. signal is present, the bearing computer may operate at least in the secondary mode. In the event the 15 Hz. signal is absent, an indication is obtained by means of an inverter 54 which provides a positive output level, indicative of the absence of the 15 Hz. modulation component. This 15 Hz. absent level is used to signal the computer to provide a display which indicates that meaningful bearing information is not being computed.

Another phase detector 56 is included in the 135 Hz. channel of the mode selection subsystem 14 which receives the 135 Hz. input signal component and the 135 Hz.∠0° synthesized component. Similarly with the phase detector 148, the phase detector 56 will produce a maximum positive output level when the synthesized 135 Hz. signal is in phase with the input 135 Hz. component. This signal is utilized to derive an output indicative of the presence of the 135 Hz. component by means of a low pass filter and amplifier circuit 58, which like the circuit 52 performs a signal present level detection function. The output of the circuit 58 is inverted to provide a level, which is indicative, as by being positive, of the absence of the 135 Hz. input signal component. The inverter 60 is utilized to provide this 135 Hz. absent level.

An AND gate 62 provides an output level when the 15 Hz. present level is produced simultaneously with the 135 Hz. absent level. This output conditions the bearing computer for operation in the secondary or 15 Hz. mode. The output of the AND gate is inverted in an inverter 64 to provide a level which conditions the bearing computer for operation in the primary mode. It will be observed that the primary mode conditioning level is produced in three cases, but is not produced in one case. The three cases are (a) where the 135 Hz. present level and the 15 Hz. present level exist, (b) where the 135 Hz. present level and the 15Hz. absent level exist, and (c) where the 135 Hz. absent level and the 15 Hz. absent level exist. Only in the case where the 135 Hz. absent level and 15 Hz. present level are produced simultaneously is the system conditioned inhibited from operating in the 135 Hz. or primary mode. As will be explained hereinafter, the 15 Hz. present level must exist before readout of the bearing computation is enabled. Therefore, notwithstanding that the system is conditioned for operation in the 135 Hz. mode, the computation is not made unless both the 135 Hz. present level and the 15 Hz. present level are produced.

Further components of the bearing computer will be understood from the following description of its operation in the primary mode. A digital counter 66 is provided which is designed so as to count backwards from a count of 4,095 to zero. This counter continuously counts the 61.44 kHz. pulses which are applied thereto from the counter 50 by way of an AND gate 68 which is enabled by the primary mode conditioning level from the inverter 64 in the mode selection system 14 and also via an OR gate 70. Thus, the counter counts down from 4,095 to zero at a 61.44 kHz. rate and repeats. At the instant the north reference burst is decoded by the Tacan set, the count in the counter is read out into a storage resistor 12. It will be observed that the north reference burst is applied to an AND gate 74 which is enabled only when the 15 Hz. present level exists, but only in the interval between clock pulses. An inverter 76 coupled to the output of the OR gate 70 applies the clock pulses in an inhibiting manner to the AND gate 74 thereby preventing readout during a clock pulse interval. This feature prevents the readout at times when the bearing computation is changing. The north reference pulse enables transfer gates 78, which couples stages of the counter to corresponding stages in the register 72, thereby setting the count into storage in the register 72.

The count is synchronized by the 15 Hz.∠0°–39° and the 135 Hz.∠180° pulses. In order that the counter representing the time interval between the proper cross-over of the first 135 Hz. signal following the first positive cross-over of the 15 Hz. signal. These synchronizing signals are obtained from the primary and secondary phase locked loops 10 and 12. The 15 Hz.∠0°–39° signal is obtained from the AND gate 34, as explained above. The 135 Hz.∠180° pulse is obtained from the AND gate 46 via an AND gate 80 when that AND gate is enabled by the 135 Hz. present level. An AND gate 82 passes the 135 Hz.∠180° pulse which occurs during the 15 Hz.∠0°–39° pulse and applies the 135 Hz.∠180° pulse to reset the backward counter 66 to a count of 3,868. A count of 3,868 is used instead of a count of zero, since the negative cross-over of the 135 Hz. signal represents a 20° lateness or delay in the bearing computation (3,868 is 228, or 20°, less than 4,096). Of course, if the leading edge of the 135 Hz.∠0° pulses were utilized the counter would be reset to zero. However, it is desirable to utilize the 135 Hz.∠180° pulse since the latter pulse can not accidentally precede the leading edge of the 15 Hz.∠0°–39° pulse as might be the case with the leading edge of the 135 Hz.∠0° pulse. When the counter 66 is read out by the north reference pulse, the count will be a number corresponding to the phase relationship between the positive going 135 Hz. cross-over which follows the 15 Hz. cross-over and the north reference pulse. This count is a measure of the bearing.

If the 15 Hz. is mode is selected, as occurs when the output of the AND gate 62 level is produced to condition the computer into the 15 Hz. (secondary mode), the AND gate 80 and 68 will, of course, be inhibited and AND gates 86 and 88 will be enabled. The 61.44 kHz. pulses will then be applied from the secondary loop via the OR gate 70 to the backward counter 56 and a 15 Hz.∠20° pulse will be applied via the AND gate 86 and the OR gate 84 to reset the backward counter to a count of 3,868 when the AND gate 82 is enabled by the 15 Hz.∠0°–39° pulse. The 15 Hz.∠20° pulse performs the function corresponding to the 135 Hz.∠180° pulse. In the event that circuits in the input to the bearing computer interpose a phase shift on the 15 Hz. component of input signal, such phase shift will be compensated by corresponding shift in the phase of the 15 Hz.∠20° pulse. The computer will then be operative in the same manner as in the primary mode that read out the bearing information once during each dwell.

The output of the register 72 is applied to a digital-to-analog converter 90 to provide an analog output which may be used on a display 92, such as the type conventionally used for Tacan bearing display.

Summarizing, therefore, the secondary mode of operation takes place when there is an inadequate 135 Hz. input signal level. The mode selection subsystem then causes the backward counter 66 to count 61.44 Hz. clock pulses generated in the secondary phase locked loop 12. The counter synchronizing or reset signal is obtained from the secondary phase locked loop and synchronizes the counter by resetting it to the proper enabling count (viz. 3,868). Thus, the system will still track the beacon with only the 15 Hz. signal component present and bearing readings will continue to be obtained.

In the event that the 15 Hz. signal is inadequate, and a 15 Hz. signal present level is not obtained at the output of the low pass filter and amplifier 52 in the mode selection subsystem 14, the north reference pulse is inhibited from updating the register 72. If the inhibit level as obtained from the output of the inverter 54 is maintained for a period of more than three seconds, the computer is operated to indicate on the display 92 that a useable bearing reading is not available. To this end, a divide by sixteen counter 94 registers a count each time the backward counter recycles through zero. This recycling will occur every 15 cycles. Accordingly, the counter will provide an output pulse train at a rate of $15/16$ Hz. The counter 94 also produces an output pulse train at a rate of 3.75 Hz. as may be obtained by a gate connected to appropriate ones of the flip-flop stages thereof. This 3.75 Hz. pulse train is applied through an AND gate 96 to partially reset the register by counts representing 5° of bearing increments under certain conditions. These conditions are that the 15 Hz. absent level is applied to the AND gate 96 and that a counter 98 which counts the $15/16$ Hz. pulses has reached a count of four. When the 3.75 Hz. pulses are applied to the register, the register count will decrease periodically at the 3.75 Hz. rate. This decrease will be translated to an analog voltage by the digital-to-analog converter 90 and applied to the display 92 so that the indicator needle on the display will rotate in a counter clockwise direction and in a stepwise manner. When the pilot or other operator of the craft observes the needle moving in this fashion, it will be apparent to him that meaningful bearing information is not being computed. The counter 98 is reset each time the 15 Hz. absent level disappears, or in other words, by the trailing edge of the 15 Hz. level whichi s indicated on the drawing by a Z shaped symbol. The 15 Hz. absent level also enables an AND gate 100 which, when enabled passes the $15/16$ Hz. pulses. Four of these pulses will be applied within a time period between three and 4¼ seconds after the 15 Hz. absent level appears. Thus, the counter will reach a count of four in this period and enable the AND gate to apply the partial reset signal (3.75 Hz.) to the register so as to flag, by virtue of the operation of the display, the situation that the bearing is not meaningful.

Figure 3:
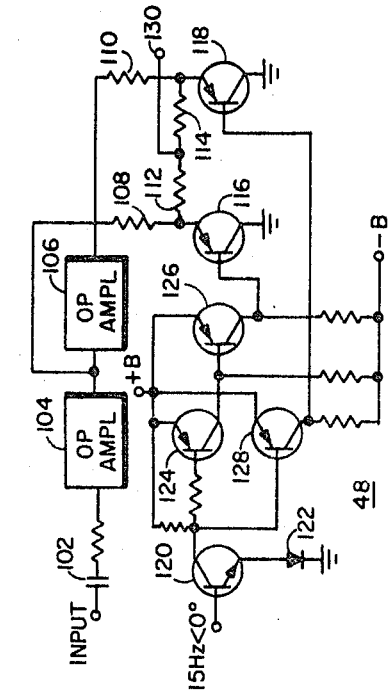
FIG. 3 is a diagram, partially in schematic and partially in block form of one of the phase detector circuits shown in FIG. 1.
Figure 4:
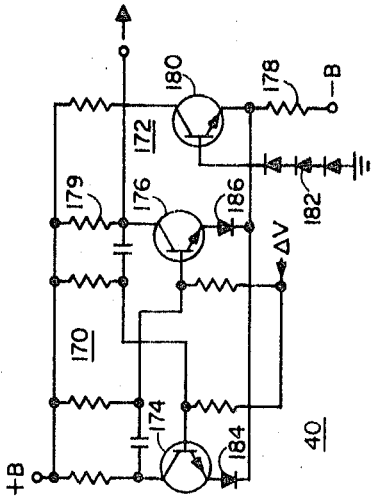
FIG. 4 is a schematic diagram of one of the voltage controlled oscillator circuits shown in FIG. 1.

FIG. 3 illustrates the phase detector 48 which is in the 15 Hz. channel of the mode selection subsystem shown in FIG. 1. The other phase detectors 16, 36, and 56 are generally similar, except that the detector 16 uses the shaped pulses of shaper 18, necessitating two separate reference drive channels. The input signal containing the 15 Hz. and 135 Hz. components are applied to one input of the phase detector, while the 15 Hz. $\angle 0°$ signal is applied to another input thereof. For DC isolation purposes, the 15 Hz. and 135 Hz. input is applied through a blocking capacitor 102. Inasmuch as this capacitor must pass the 15 Hz. component, it is desirable of a high value of capacitance, say two to five microfarads. Even this value of capacitance is relatively low, considering that 15 Hz. must be passed, by virtue of relatively high input impedance which could give rise to drift in input potential, and consequent errors, were it not for the use of two operational amplifiers 104 and 106 connected in inverting configuration with respect to the phase detector. These operational amplifiers provide output signals which are inverted in phase with respect to each other. These output signals are applied via resistors 108 and 110 connected to the emitters of the phase detector transistors. The drift of amplifier 104 cancels because it appears in out-of-phase relationship at the output of amplifier 106. Output resistors 112 and 114 are connected in balanced relationship to the output terminal 130. Inasmuch as the resistors 112 and 114 are of equal value, the unbalance caused by DC drift of amplifier 104 is cancelled in the phase detector.

The 15 Hz. $\angle 0°$ signal is amplified in a first stage including a transistor 120, the emitter bias for which is established by a diode 122. The 15 Hz. $\angle 0°$ signals which are out-of-phase with each other are provided by a two stage amplifier including two transistors 124 and 126, the output of which is connected to the base of the phase detector transistor 116 and by one stage amplifier including transistor 128, the output of which is connected to the base of the other phase detector transistor 118. The phase detector transistors operate therefore as a balanced pair. It will be recalled that this phase detector 48 is designed to produce a positive output when the input and the synthesized 15 Hz. $\angle 0°$ are in phase. In operation therefore, the 15 Hz. $\angle 0°$ signal, during its positive half-cycle, will bias the phase detector transistor 116 into conduction. Since the opposite phase of the 15 Hz. $\angle 0°$ is applied to the transistor 118, that transistor 118, will be biased to non-conduction during the positive or first half-cycle. When the 15 Hz. input component is in phase with the 15 Hz. $\angle 0°$ signal, the out-of-phase output of amplifier 104, through resistor 108, will be shorted out by conduction of transistor 116. The in-phase output of amplifier 106, through resistor 110, arrives at the non-conducting transistor 118. Through resistor 114, a portion of this positive voltage reaches the output terminal 130. During the second half-cycle, the roles of transistors 116 and 118 are reversed and again a positive voltage reaches output terminal 130, this time via amplifier 104, resistor 108, and resistor 112. Accordingly, the output waveform, when the input and 15 Hz. $\angle 0°$ signals are in phase will be similar to a full wave rectifier output. When the 15 Hz. input signal and the 15 Hz. $\angle 0°$ signals are 180° out-of-phase with each other, the output voltage appearing at the terminal 130 will be of similar waveform but opposite in polarity to the output which is produced when an in-phase condition exists. It follows therefore, that a minimum or null output is produced from the phase detector when the input 15 Hz. component and the 15 Hz. $\angle 0°$ signal are 90° or 270° out-of-phase with each other.

The phase detector desirably utilizes bi-lateral transistors as the phase detecting transistors 116 and 118. Such transistors as the 2N945 have been found to be suitable. The illustrated phase detector has a high degree of sensitivity since relatively high level input signals may be applied thereto. It also has a very fast dynamic response and is capable of providing outputs indicative of the magnitude and sense of phase shift over a complete cycle of the signals (viz 360°).

In order to utilize the phase detector and to provide a null output when the input signals thereto are in phase with each other, which is the case for the phase detectors 16 and 36, the synthesized input signal shifted in phase by 90° may be applied thereto, as is indicated in FIG. 1 in the case of the detector 36. In the event that two synthesized signals at 90° and at 270° (viz 180° out-of-phase with each other) are available for driving the phase detector from the phase locked loop, these signals may be applied directly to the phase detector and two input circuit similar to the circuits including the transistors 120 and 128 may be provided, each for applying a different one of the inputs, which are respectively phase shifted 90° and 270°, to the bases of the transistors 116 and 118.

When an input to a balanced phase detector contains an odd harmonic component, such as is the case in the bearing computer system wherein the 135 Hz. component is a ninth harmonic of the 15 Hz. component, an erroneous output will be produced, since the odd harmonic does not balance out in each half-cycle of the fundamental while the fundamental is being compared with the reference signal. The reference signal in this case may be considered to be the 15 Hz. signal obtained from the secondary phase locked loop. To this end, the pulse shaping loop 18 is utilized to shorten the phase detector 16 driving signals so that they contain an integral number of cycles of the 135 Hz. component. Accordingly, the driving signals are indicated in FIG. 1 as 15 Hz. $\angle 90s°$ and 15 Hz. $\angle 270s°$. These driving signals are shown in waveforms as M and N in FIG. 6. It will be observed by comparing these signals with the input signal in the upper most waveform in FIG. 2 that each positive half-cycle thereof contains an equal number (4) cycles of the 135 Hz. component. It will be appreciated, of course, that in lieu of shortened driving signals, the driving signals may be lengthened. In the latter case, the phase detector will be operative for approximately five cycles of the 135 Hz. component instead of four cycles. In either case, the phase detector will be balanced with respect to the odd harmonic component and its effect will be cancelled in the output of the phase detector.

Figure 5:
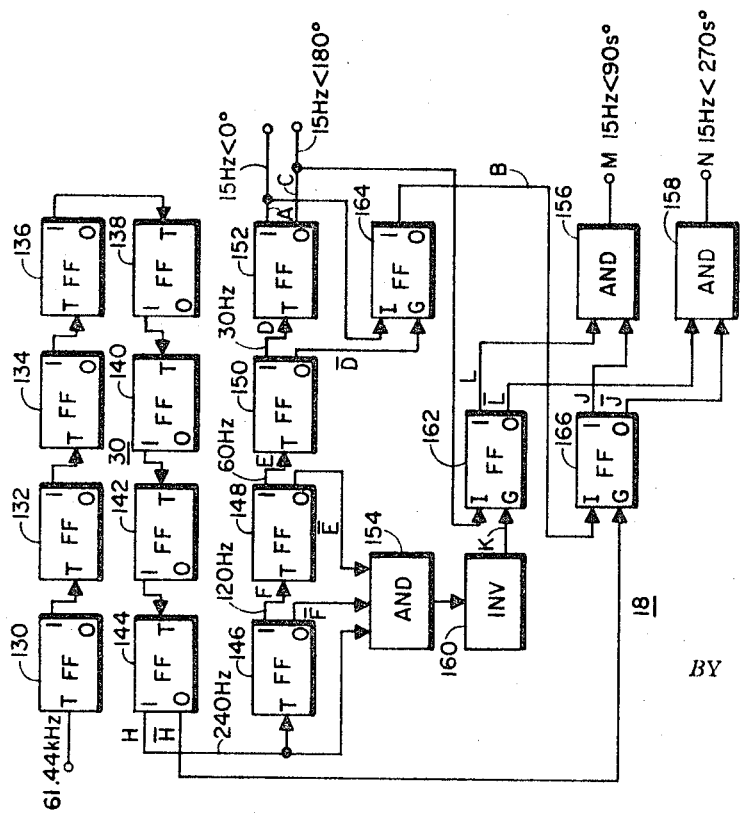
FIG. 5 is a block diagram of the counter and of the pulse shaping logic subsystem which forms part of the secondary phase locked loop shown in FIG. 1.

The pulse shaping loop 18 is shown in FIG. 5. The operation thereof will be apparent in connection with the waveforms shown in FIG. 6. The flip-flop stages 130, 132, 134, 136, 138, 140, 142, 144, 146, 148, 150 and 152 which are included in the counter 30 are illustrated. AND gates 154, 156 and 158, together with an inverter 160 and flip-flops 162, 164 and 166 of the steered input type are included. These flip-flops have an I and G inputs. The I input designates the instructions which the flip-flops will follow and the G input designates the input which must be signalled if the instructions are to be executed. For example, if a positive level is applied to the I input of a flip-flop, the 1 output terminal of the flip-flop will go positive when a positive going signal is applied to the G input. Therefore, the 1 output will represent a logic level which may be taken to be a binary 1 bit. On the other hand, if a negative or low level is applied to the I input, the 1 output of the flip-flop will be set to a level representing a 0 bit when a positive-going signal is applied to the G input. A suitable flip-flop which performs the foregoing functions is the type SN5474 sold by Texas Instruments, Inc., Dallas, Tex.

Figure 6:
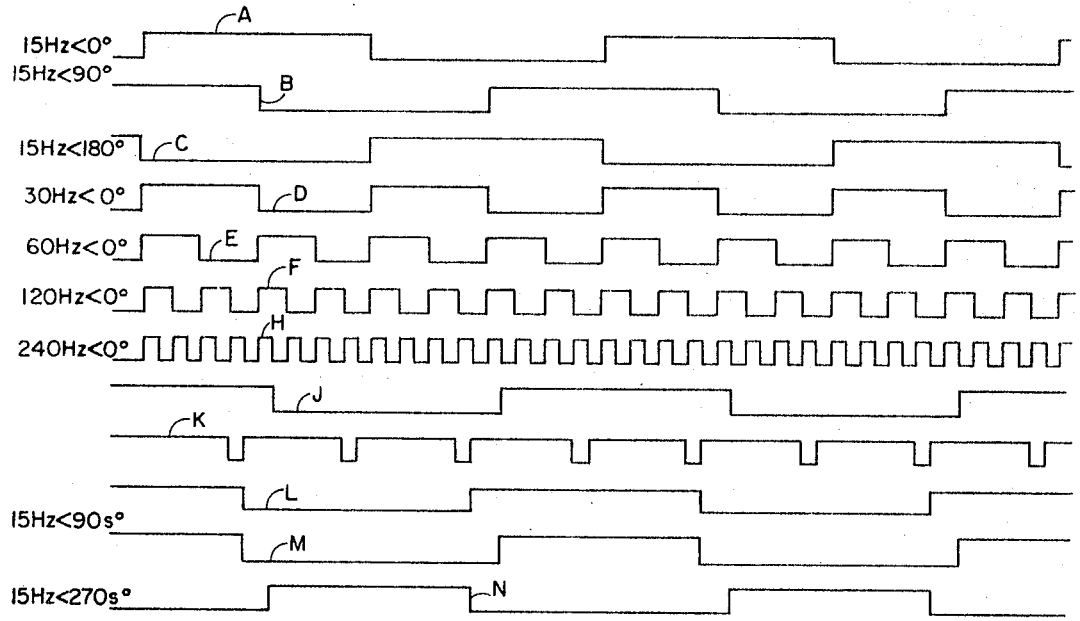
FIG. 6 is a waveform diagram showing waveforms of signals appearing in the subsystem shown in FIG. 5.

The waveforms in FIG. 6 are labeled with the letters which appear adjacent to different lines in the pulse shaping logic 18, as shown in FIG. 5. An input to the counter 30 is the 61.44 kHz. output of the subract logic 28. The inputs A (15 Hz.$\angle 0°$), C (15 Hz.$\angle 180°$), D (30 Hz.$\angle 0°$), E (60 Hz.$\angle 0°$), F (120 Hz.$\angle 0°$) and H (240 Hz.$\angle 0°$) are obtained from the outputs of the latter flip-flops 152, 150, 148, 146 and 144 which are part of the counter 30. The A output and the $\overline{D}$ input from the flip-flops 152 and 150 are utilized in the flip-flop 164 to provide the B (15 Hz.$\angle 90°$) output. The shortened 15 Hz. phase detected driving signals M and N are obtained by first obtaining pulse trains J and L which are phase shifted from B by amounts corresponding to half-cycles of the 240 Hz. flip-flop and then combining these waveforms by digital logic techniques to derive the M and N phase detector driving signals. The J waveforms are obtained from the flip-flop 166 by applying the B output as the instruction level to the flip-flop 166 and setting the flip-flop 166 upon occurrence to the $\overline{H}$ 240 Hz.$\angle 180°$ pulse train. In order to obtain the L pulse train, the K signal is obtained by means of the AND gate 154 and the inverter 160 which solves the Boolean equation $K = \overline{B.F.H}$. The L level utilizes the K input as the execute or gate input G to the flip-flop 162, while the instruct input is derived from the C (15 Hz.$\angle 180°$) output. (Note that execution occurs as K rises.)

Referring to FIG. 4, the voltage controlled oscillator 40 is shown. This voltage controlled oscillator consists of a multivibrator section 170 and a temperature compensation section 172. The multivibrator section contains two transistors 174 and 176 connected in regenerative relationship. Control over the switching point is obtained by the error voltage ($\Delta V$) which is applied thereto from the filter and amplifier 38. The output pulse train appears across the resistor 179. The diodes 182 which are connected to the base of the transistor 180 produce a change with temperature, in current flow through the resistor 178 opposite to the change in current flow due to temperature affect upon the multivibrator transistors 174 and 176. Accordingly the emitter bias on their transistors 174 and 178 stays constant with changes in temperature and temperature affects do not materially effect the nominal frequency of the VCO 40. The diodes 184 and 186 connected to the emitters of the transistors 174 and 176 protect these transistors from the affects of any excessive negative base voltage.

From the foregoing description, it will be apparent that there has been provided an improved electronic navigation system especially suitable for use as a bearing computer in a Tacan set. The herein described bearing computer and its associated subsystems and circuits are, of course, illustrative of a system which may be constructed in accordance with the invention. Variations and modifications in the herein described system will undoubtedly become apparent to those skilled in the art. Accordingly, the foregoing description should be taken as illustrative and not in any limiting sense.

What is claimed is:

1. An electronic navigation system for calculating a result on the basis of the phase relationship of a pair of signals, said system comprising
    (a) a phase locked loop responsive to a first of said signals for synthesizing signals having a frequency very much higher than the frequency of said first signals as well as signals of the same frequency as said first signals,
    (b) means for counting the cycles of said higher frequency signals,
    (c) means responsive to said synthesized first signals for synchronizing said counting means, and
    (d) means for reading out said counter upon occurrence of the second of said pair of signals for obtaining a count representative of said result.

2. The invention as set forth in claim 1 wherein said counting means is a counter which counts to a predetermined number and then recycles.

3. The invention as set forth in claim 2 wherein said phase locked loop includes
    (a) means for generating said higher frequency signals, the frequency of which is variable in response to a control signal,
    (b) a counter responsive to said higher frequency signals for generating said synthesized first signals, and
    (c) a phase detector responsive to said first signals and to said synthesized signals for generating said control signal.

4. A bearing computer for computing bearing represented by the phase relationship between a reference signal and first and second signals respectively, of lower and higher frequency, said bearing computer comprising
    (a) a first phase locked loop responsive to said first signal for synthesizing a signal corresponding in frequency to said first signal and another signal of very much higher frequency,
    (b) a second phase locked loop responsive to said second signal for synthesizing a signal equal in frequency to said second signal and also other signals having the same frequency of said very high frequency, (c) means for counting the cycles of said higher frequency signal from at least one of said loops, (d) means for synchronizing said counter responsive to the synthesized signals from at least one of said loops, and (e) means responsive to said reference signal for reading out the count stored in said counter upon occurrence of said reference signal, said count representing said bearing.

5. The invention as set forth in claim 4 including means responsive to a signal synthesized in said first loop for applying as said synchronizing signal to said counter, the synthesized signal from said first loop which occurs in a predetermined time relationship with said synthesized signal from said second loop.

6. The invention as set forth in claim 4 including means responsive to said first and second signals for applying to said counter signals from said second loop when said first signal and said second signals are above a predetermined level and signals only from said first loop when only said first signals are above said predetermined level.

7. The invention as set forth in claim 6 including means responsive to said counter for displaying an indication of said bearing, and means responsive to the absence of said first signal of more than said predetermined magnitude for operating said display means to indicate that said bearing information is not meaningful.

8. A system for computing the bearing of a craft with respect to a beacon which transmits (a) a first and a second input signal which are respectively of lower and higher frequency and are harmonically related to each other and (b) a reference direction signal the time relationship between which and said first and second signals as received at said craft is a measure of the bearing of said craft with respect to said reference direction to respectively coarse and fine accuracies, said system comprising, (a) means responsive to said first and second signals for synthesizing signals corresponding thereto in frequency and phase and at least one signal which is substantially higher in frequency than said synthesized signals, (b) means responsive to said synthesized signal corresponding to first signal for providing pulses repetitive at said lower frequency having a duration corresponding to the period of a cycle of said higher frequency and occurring at the beginning of each cycle of said synthesized first signal, (c) means responsive to said first signal for providing a first output representing the absence and presence thereof, (d) means responsive to said second signal for providing a second output representing the absence and presence thereof, (e) a counter for counting the cycles of said substantially higher frequency signal from said synthesizing means, said counter having a reset input, (f) gate means responsive to said pulses, and said first and second outputs for applying to said counter (i) said second synthesized signal when said outputs represent the presence of said first and second signal, and (ii) said first synthesized signal when said first output represents the presence of said first signal and said second output represents the absence of said second signal, and (g) means for utilizing as said bearing indication the count stored in said counter upon occurrence of said reference signal.

9. The invention as set forth in claim 8 wherein the utilizing means set forth in sub-section (g) comprises (a) a register for storing the count accumulated in said counter, (b) gate means for transferring said count from said counter to said register when enabled, (c) display means coupled to said register for indicating the count stored therein as a reading of bearing, and (d) means for enabling said gate means when said first output represents the presence of said first signal and upon occurrence of said reference signal.

10. The invention as set forth in claim 9 wherein said substantially higher frequency signal is a train of pulses and wherein said enabling means as set forth in sub-section (d) of claim 9 is a gate responsive to the pulses of said train, which is inhibited during occurrence thereof.

11. The invention as set forth in claim 9 including means responsive to said first output when said first output represents the absence of said first signal for a predetermined interval of time for repeatedly altering the reading on said display means.

12. The invention as set forth in claim 11 wherein said reading altering means comprises (a) a source providing two pulse trains having repetition rates both less than the frequency of said reference signal, (b) gate means for applying the pulses of one of said trains to said register for partially resetting said register when said gate means is enabled, (c) counter means responsive to the other of said pulse trains when said first output represents the absence of said first signal for inhibiting said gate means unless the number of pulses which would occur during said predetermined time period is accumulated therein, and (d) means for applying said first output to said counter means for resetting said counter upon occurrence of a transition in said first output indicative of a change from the absence to the presence of said first signal.

13. The invention as set forth in claim 12 wherein said source is a counter which is coupled to said counter set forth in sub-section (e) of claim 8 which is responsive to recycling of said last named counter through zero and accumulates a count upon each said recycling.

14. The invention as set forth in claim 8 wherein the means set forth in sub-section (c) comprising (a) a phase detector for producing an output level which decreases in response to deviations in the phase relationship of like-frequency signals from a predetermined phase relationship with respect to each other, (b) means for applying said first signal to said phase detector, (c) means for applying from said synthesizing means to said phase detector synthesized first signals having said predetermined phase relationship with said first signals, and (d) means responsive to output levels from said phase detector above and below a predetermined level for providing said first output respectively representing the presence and absence of said first signal.

15. The invention as set forth in claim 8 wherein the means set forth in section (d) of claim 8 comprises means responsive to output levels from said phase detector above and below a predetermined level for providing said second output respectively representing the presence and absence of said second signal.

16. The invention as set forth in claim 14 wherein said phase detector comprises two pairs of inputs and an output connected in balanced relationship between one of said pairs of inputs, a pair of active devices connected in balanced relationship to said output, means for connecting said other pair of inputs each to a different one of said devices for unbalancing said output when said devices become conductive, means for applying said input signals in out-of-phase relation to said first named pair of inputs and said synthetized signals in out-of-phase relation to the other of said pair of inputs.

17. The invention as set forth in claim 8 wherein said synthesizing means comprises first and second phase locked loops respectively for synthesizing said first and second signals, said first and second loops including,
(a) a phase detector responsive to said input signals and said synthesized signals,
(b) a voltage controlled oscillator responsive to error signal produced by said phase detector,
(c) a counter operatively coupled to said voltage controlled oscillator for providing said synthesized signals.

18. The invention as set forth in claim 17 and further including,
(a) frequency translation means included in each of said loops between the voltage controlled oscillation and counter thereof, the output of said frequency translation means each providing said higher frequency signals with like frequency.
(b) a stable oscillator having a frequency much higher than the nominal frequencies of said voltage controlled oscillation in said loops, and
(c) means operatively coupling said oscillator to each of said loop frequency translation means.

19. The invention as set forth in claim 18 wherein said frequency translation means comprises logic circuits for substracting the frequency of said voltage controlled oscillators from the frequency applied thereto from said stable oscillator for providing outputs for driving said loop counters.

20. The invention as set forth in claim 17, wherein said input signals applied to said first loop phase detector includes both said first and second signals which are not even harmonics of each other, including means responsive to the output of said counter for applying to said phase detector, synthesized signals at the frequency of said first signal having durations in each half cycles thereof equal to the durations of an integral number of cycles of said second signal.

21. The invention as set forth in claim 20, wherein said counter output responsive means includes logic circuits for combining synthesized pulses of different frequencies all harmonicaly related to the frequency of said first signal.

22. The invention as set forth in claim 17 wherein said phase detectors each comprises a circuit including a pair of transistors and having two pair of inputs, means for applying driving signals from said counter which are in quadrature to said input signals, in out-of-phase relationship to a first of said pairs of inputs, means for applying said input signals in out-of-phase relationship to the second of said pair of inputs, one of said collector and emitter of said transistors having a balanced circuit connected therebetween, said second of said pair of inputs being connected to said balanced circuit, the first of said pair of inputs being connected each to the base of a different one of said transistors, and an output terminal connected in balanced relationship to said transistors in said balanced circuit.

References Cited
UNITED STATES PATENTS

| | | | |
|---|---|---|---|
| 2,912,691 | 11/1959 | Mandel | 343—106 |
| 3,209,254 | 9/1965 | Hossmann | 324—83 |
| 3,332,080 | 7/1967 | Verwey | 343—106 |
| 3,349,401 | 10/1967 | Kennedy et al. | 343—106 |

RODNEY D. BENNETT, Jr., Primary Examiner

HERBERT C. WAMSLEY, Assistant Examiner

U.S. Cl. X.R.

324—83